US006897778B1

(12) United States Patent
Borlenghi

(10) Patent No.: US 6,897,778 B1
(45) Date of Patent: May 24, 2005

(54) SYSTEM FOR IDENTIFYING A PERSONAL ITEM, SUCH AS AN ITEM OF CLOTHING, AN ACCESSORY OR A PORTABLE DEVICE

(76) Inventor: Paolo Borlenghi, Via Varese, 14, 20121 Milano (IT)

( * ) Notice: Subject to any disclaimer, the term of this patent is extended or adjusted under 35 U.S.C. 154(b) by 196 days.

(21) Appl. No.: 10/111,362
(22) PCT Filed: Oct. 25, 2000
(86) PCT No.: PCT/IT00/00431
§ 371 (c)(1),
(2), (4) Date: Sep. 18, 2002
(87) PCT Pub. No.: WO01/31600
PCT Pub. Date: May 3, 2001

(30) Foreign Application Priority Data

Oct. 26, 1999 (IT) .......................................... MI99A2235

(51) Int. Cl.[7] .............................................. G08B 13/14
(52) U.S. Cl. ................ 340/572.4; 340/539.1; 340/539.11; 340/539.13; 340/573.1; 340/571
(58) Field of Search ..................... 340/539.1, 539.11, 340/539.13, 539.12, 539.15, 539.32, 572.4, 575.1, 573.4, 571

(56) References Cited

U.S. PATENT DOCUMENTS 6,747,561 B1 * 6/2004 Reeves .................... 340/573.1

* cited by examiner

Primary Examiner—Daryl C. Pope
(74) Attorney, Agent, or Firm—Chapman and Cutler LLP

(57) ABSTRACT

A personal item (3), such as an item of clothing, an accessory or a portable device, is fitted with an identification tag (2) having memory means (11) for recording an individual code assigned to the tag (2), and emitting means (12) for emitting a signal representing the individual code; a portable detecting device (4) has enabling means (16) for enabling the emitting means (12) and for transmitting an inquiry signal to the tag (2) and receiving, in response, the signal representing the individual code and emitted by the emitting means (12) of the tag (2); and the individual code so detected may then be used as an E-mail box address on a dedicated internet web site to contact the owner of the tag (2), thus providing a straightforward, effective way of establishing interpersonal relationships between strangers, while at the same time ensuring their anonymity.

33 Claims, 1 Drawing Sheet

SYSTEM FOR IDENTIFYING A PERSONAL ITEM, SUCH AS AN ITEM OF CLOTHING, AN ACCESSORY OR A PORTABLE DEVICE

TECHNICAL FIELD

The present invention relates to a system for identifying a personal item, such as an item of clothing, an accessory or a portable device, and which provides for establishing a deferred interpersonal relationship between strangers meeting by chance, while at the same time keeping their identities secret. The invention therefore also relates to a system for establishing deferred interpersonal relationships.

BACKGROUND ART

As is known, many people, especially those of a shy disposition, find it difficult to approach strangers encountered by chance and who they would like to get to know better, possibly with a view to establishing a sentimental relationship. The same also applies even to normally extrovert people, who fear they may give the wrong impression and, in so doing, compromise the possibility of establishing any sort of future relationship.

The problem is further compounded, especially in more developed societies, by a general mistrust of strangers who are viewed either as possible aggressors or simply as a source of annoyance. Exaggeratedly profit-oriented businesses are also probably responsible for furthering personal isolation on the grounds of business dealings and client relationships being more effective and profitable in direct proportion to the extent to which they are kept anonymous and devoid of any emotional involvement.

The problem of establishing interpersonal relationships between strangers is probably the reason for the enormous success of internet web sites, which enable strangers, while remaining anonymous, to communicate and exchange more or less personal information by E-mail. This may continue to the point of establishing a "remote" relationship of trust and confidence, so that the individuals involved may eventually reveal their identities and meet in person. Conversely, if no interest is aroused in furthering the relationship, the E-mail link may be interrupted at any time.

To assist the establishment of interpersonal relationships between strangers, some public premises have installed stations by which patrons can communicate electronically: each table is equipped with a station to which other tables can send messages using, for example, the table number as an address. Anyone arousing a certain amount of interest may therefore be sent a message which is displayed at their particular station, thus establishing initial contact. Such a system, however, obviously only applies within the confines of given premises in which the individuals involved are identifiable by a visible code.

Elsewhere, it is normally impossible to approach a stranger encountered by chance, and of whom, obviously, no personal details and, in particular, no E-mail address are known.

DISCLOSURE OF INVENTION

It is an object of the present invention to provide a system for identifying a personal item, and which permits deferred interpersonal communication with the owner of the item, while at the same time ensuring his or her anonymity.

According to the present invention, there is provided an identification system for identifying a personal item, such as an item or clothing, an accessory or a portable device, characterized by comprising an identification tag fittable to said personal item, and a portable detecting device separate from said tag; said tag having memory means for recording an individual code assigned to said tag, and emitting means for emitting a signal representing said individual code; and said detecting device having receiving means for picking up said signal representing said individual code and emitted by said emitting means.

There is therefore provided a system for identifying a personal item, which enables the establishment of deferred interpersonal communication with the owner of the item, while at the same time ensuring his or her anonymity, and which therefore provides a safe, effective way of establishing deferred interpersonal relationships.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
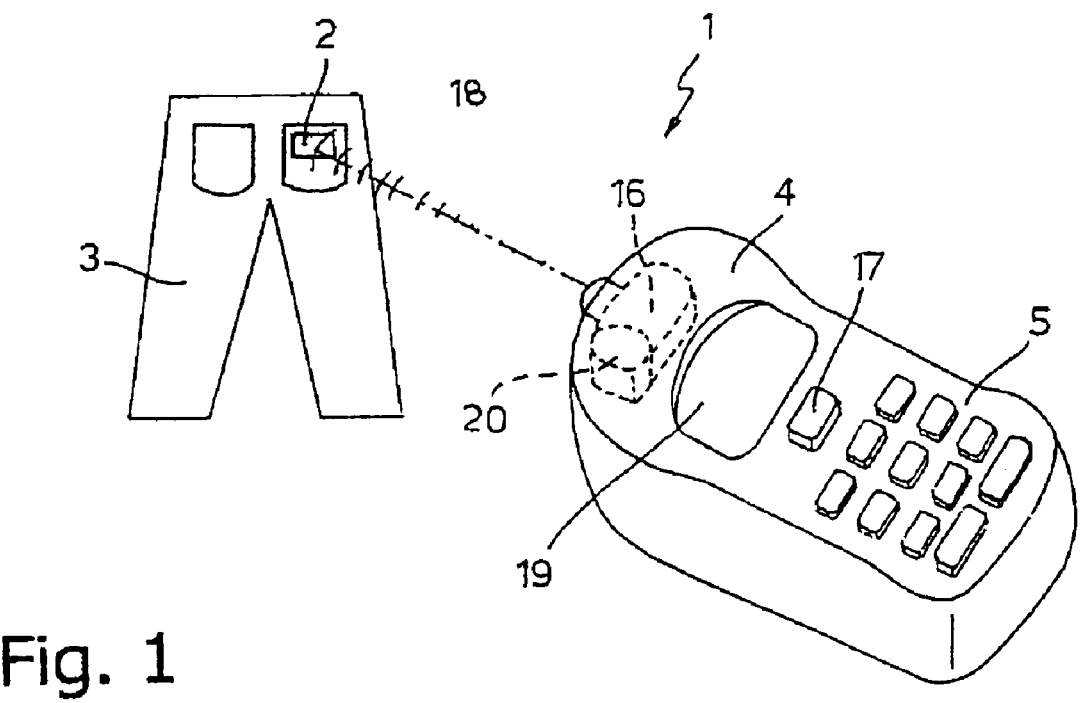
FIG. 1 shows a schematic view of an identification system in accordance with the invention.
Figure 2:
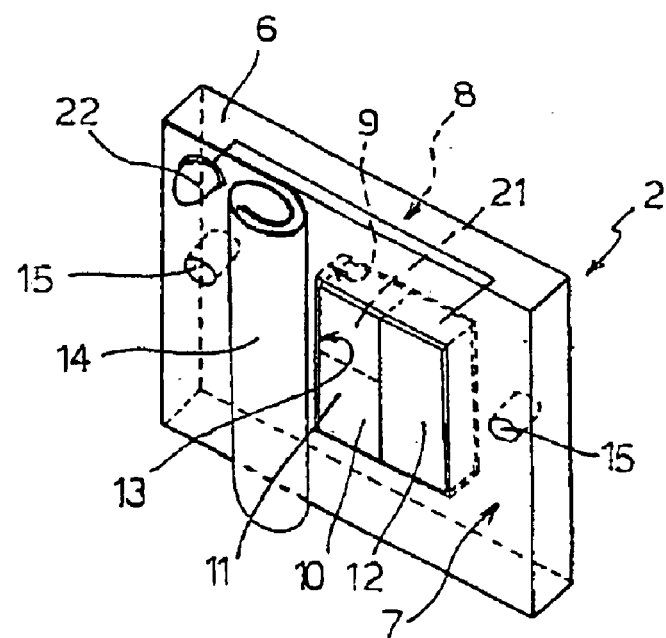
FIG. 2 shows an enlarged detail of the FIG. 1 system

With reference to FIGS. 1 and 2, an identification system 1 comprises an identification tag 2 fittable to any personal item 3, e.g. an item of clothing, an accessory or a portable device; and a portable detecting device 4 separate from tag 2. In the non-limiting example shown in FIG. 1, tag 2 is applied visibly in known manner to a pair of trousers 3, and detecting device 4 is integrated in a known cell phone 5. It is understood, however, that detecting device 4 may be housed in any other type of portable device, or in a generic casing of any sort, even one with no other function, (a key-ring, gadget, etc.).

Tag 2 may be any shape or size, and may be made of any suitable material. As shown in detail in FIG. 2, tag 2 comprises a sheet 6, which may be rigid (e.g. of plastic or metal) or flexible (e.g. of leather, fabric or suitable polymer material), and which is defined by two opposite surfaces 7, 8. Sheet 6 has a seat 9 housing an information device 10 (e.g. a known microchip) comprising memory means 11, and emitting means 12 associated with memory means 11. Memory means 11 provide for recording an individual code assigned to tag 2, and emitting means 12 generate an individual code signal as explained later on.

In the non-limiting example shown in FIGS. 1 and 2, seat 9 is a dead seat having a front opening 13 formed in surface 7 of sheet 6 and through which to insert information device 10 inside seat 9; and front opening 13 is closed by a label 14, e.g. an adhesive label, which is applied to surface 7 to retain information device 10 inside seat 9 (in which case, information device 10 may be glued to the face of label 14 facing seat 9).

Tag 2 may be applied to personal item 3 in any known manner, depending on the type of personal item 3 involved. In particular, appropriate fastening means 15 (e.g. through holes in sheet 6) may be provided, or tag 2 may be sewn or glued to personal item 3. Tag 2 may obviously be fitted to personal item 3 with surface 7 applied to a surface of personal item 3 and with the opposite surface 8 exposed, or vice versa; and the exposed surface 7 or 8 may show commercial information, graphics and/or any other desired elements.

Detecting device 4 comprises enabling means 16 for enabling emitting means 12 of tag 2, and which are activated by a control button 17, which, in the example shown, is a dedicated key on cell phone 5. Enabling means 16 transmit an inquiry signal to tag 2, and receive, in response to the inquiry signal, a signal representing the individual code of tag 2 and emitted by emitting means 12 or the basis of the information recorded in associated memory means 11.

Emitting means 12 only emit the signal representing the individual code of tag 2 in response to the inquiry signal generated by enabling means 16 of detecting device 4. In the absence of the inquiry signal, emitting means 12 are not enabled, and emit no signal. For example, emitting means 12 comprise a known passive transponder (not shown in detail for the sake of simplicity) enabled by enabling means 16, which are of the type for generating the inquiry signal in a predetermined direction 18. For example, enabling means 16 may be means (of any known type) for emitting radio-frequency or infrared signals.

Detecting device 4 also comprises known display means 19 for displaying the individual code and defined, for example, by the display on cell phone 5.

Identification system 1 operates as follows. On encountering the owner of a tag 2, the owner of a detecting device 4 points detecting device 4 towards the tag 2 of the other person and presses button 17 to activate enabling means 16 in the direction of tag 2; the inquiry signal generated by enabling means 16 enables emitting means 12 of tag 2, which, in response to the inquiry signal, emit a signal representing the individual code assigned to tag 2 and contained in memory means 11; and the signal representing the individual code of tag 2 is picked up by detecting device 4 and displayed on display 19.

Even in the presence of a number of tags 2, and therefore of as many separate emitting means 12, detecting device 4 only picks up the signal corresponding to the desired tag 2. According to the invention, in fact, emitting means 12 of tag 2 only generate the code signal in response to the inquiry signal of detecting device 4, which is emitted in a predetermined direction and therefore only directed onto the desired tag 2. Detecting device 4 therefore only receives the activated response signal emitted by the tag onto which the inquiry signal is directed. The individual code may obviously be of any type, e.g. an alphanumeric string (which may also include letters indicating the city in which tag 2 was purchased, such as MI-510-AB). At this point, the individual code may be used to contact the owner of tag 2 in various ways, but all ensuring the anonymity of the owner. For example, when purchasing tag 2 (i.e. the personal item 3 to which tag 2 is applied), the buyer is assigned (obviously with his or her approval) an E-mail box accessible directly, given the corresponding individual code, by means of a dedicated internet web site. By calling up the web site and entering the individual code (detected in the course of a chance encounter), an E-mail message can be sent to the person of interest, and one's own individual code left for a reply. The receiver, connected to the same internet web site, can read the message and, still remaining anonymous, may decide whether or not to reply. That is, all communications, as opposed to being transmitted directly to an actual personal E-mail address, are controlled by a common service ensuring the anonymity of each receiver, who can decide whether to receive and whether or not to reply to any messages received.

Additional, non-identifying information concerning each service user (such as physical appearance, character, interests, zodiac sign, etc.) may be recorded on an information card which can be consulted, via the same dedicated internet web site, before the message is sent.

In short, to get in touch with a person encountered by chance and in possession of any personal item 3 bearing a tag 2 according to the invention, detecting device 4 provides for learning the individual code of the person in question; and the individual code detected is used as an E-mail box address on a dedicated internet web site.

The individual code and corresponding E-mail box may be assigned (and the relative information card compiled) when purchasing personal item 3 fitted with tag 2, and with which a detecting device 4 is also provided (e.g. in the form of a gadget), or when purchasing detecting device 4 itself, if this forms part of a relatively expensive device such as a cell phone 5. In the latter case, tag 2 will be applied to the same device housing detecting device 4.

This therefore provides for a straightforward, effective way of establishing interpersonal relationships between strangers, while at the same time ensuring their anonymity.

Tag 2 may be applied to any sort of personal item 3, e.g. an item of clothing, a bag or rucksack, an accessory such as a pair of glasses, a cell phone, etc., and need not necessarily be visible. Detecting device 4, in fact, may be activated in the direction of the person of interest even without knowing whether the person is actually in possession of a tag 2. Obviously, if the person has no item fitted with a tag 2, no individual code will be detected. Tag 2 may even be applied inside personal item 3, e.g. inside a cell phone 5, which would therefore be provided with both tag 2 and detecting device 4.

The advantage of integrating detecting device 4 in a cell phone 5 lies in the possibility of communicating via E-mail, once the individual code of the person of interest is detected, using the same cell phone 5, if this is designed for internet access.

As opposed to letters, the individual code assigned to tag 2 may be an E-mail address (e.g. a reserved box on a dedicated internet web site), in which case, the owner of detecting device 4 may contact the owner of tag 2 by sending an E-mail message to that address. The individual code may even be a phone number, in which case, the owner of detecting device 4 may contact the person in question by phoning or sending a text message (SMS) to the phone number.

In one possible variation, emitting means 12 of tag 2 need not be enabled by the inquiry signal emitted by enabling means 16 of detecting device 4, but continually transmit the signal representing the individual code assigned to tag 2. In which case, detecting device 4 has receiving means 20 for picking up the individual code signal emitted by emitting means 12.

In another variation, information device 10, defined for example by a known microprocessor, also comprises processing means 21 associated with memory means 11 and capable of processing the inquiry signal emitted by detecting device 4 and comparing it with a series of parameters recorded in memory means 11; and emitting means 12 are only enabled if the inquiry signal processed by processing means 21 of information device 10 is compatible with the parameters stored on tag 2. For example, the parameters recorded in memory means 11 may represent a personal profile of the owner of tag 2 (physical appearance, character, etc.) memorized together with (or as part of) the individual code when purchasing tag 2. Accordingly, the inquiry signal emitted by detecting device 4 transmits various information concerning the characteristics of the type of person the owner of detecting device 4 wishes to contact, and which is received, processed and compared with the profile contained in memory means 11: in the event of a match (i.e. the profile sought by the owner of detecting device 4 matches that of the owner of tag 2), information device 10 enables emitting means 12 to transmit the reply signal; conversely, the emitting means are not enabled.

In this variation, as opposed to being one-way, the inquiry signal emitted by detecting device 4 may be received by several tags 2, so that detecting device 4 may be activated, not towards a specific person to be contacted, but towards a group to determine whether or not the group contains a compatible profile. The information concerning the characteristics of the person to be contacted may be entered into detecting device 4 either at the time of purchase or at a later date, e.g. via the dedicated internet web site.

This variation is especially suitable when tag 2 is applied to a cell phone 5 also equipped with a detecting device 4, in which case, tag 2 may also be used as the actual cell phone 5 card (enabling/activating card, "simcard").

Detecting device 4 may advantageously comprise two separate control buttons 17 for enabling the two different operating modes of identification system 1 (wherein the inquiry signal automatically enables emitting means 12, or also represents the sought personal profile).

Identification system 1 may also be advantageously applied to wristwatches, possibly with an integrated cell phone, or to portable computers, in particular miniature so-called palm-top types possibly also with an integrated cell phone function. In which case, tag 2 and detecting device 4, incorporated in the palm-top computer (with tag 2 visible or not), may be connected to the processor, and so employ the memory and processing means, of the palm-top computer itself.

According to a further aspect of the invention, tag 2 comprises indicator means 22 of any known type, e.g. vibration, sound or visual (purely by way of example, FIG. 2 shows light-emitting indicator means 22), connected to emitting means 12 of tag 2 and which emit an indication signal of any known type to inform the user that emitting means 12 have received an inquiry signal. The inquiry signal emitted by detecting device 4 therefore activates both emitting means 12 and indicator means 22 simultaneously.

In a further variation not shown, as opposed to control button 17, enabling means 16 are activated by a known sensor for detecting physiological parameters and applied to detecting device 4. For example, if detecting device 4 forms part of a wrist-watch or a jewel worn next to the skin, the sensor may detect, by contact with the skin, the user's heartbeat (or any other parameter preferably related to the emotional state of the user). And, on detecting a predetermined variation in the observed parameter (e.g. an increase in heartbeat caused by encountering a person the user would like to contact), the sensor automatically activates enabling means 16 to emit the inquiry signal.

What is claimed is:

1. A system for establishing deferred interpersonal relationships between individuals meeting by chance, comprising an identification tag (2) applied to a personal item (3); said tag (2) having means for recording (11) an individual code assigned to said tag (2), and means for emitting a signal representing said individual code (12);

a portable detecting devise (4) having means for receiving (20) said signal representing said individual code emitted by said means for emitting a signal representing said individual code (12); and a dedicated internet web site having an E-mail box associated to said individual code and assigned to an owner of said item, wherein said E-mail box is accessible directly, given said individual code, via said dedicated internet web site, while ensuring the anonymity of the owner of said item.

2. A system as claimed in claim 1, wherein said personal item is a cell phone (5) comprising both said detecting device (4) and said tag (2).

3. A system as claimed in claim 1, wherein said detecting device (4) also comprises means for enabling (16) said means for emitting a signal representing said individual code (12), said means for enabling (16) being associated with said means for receiving (20) to transmit an inquiry signal to said tag (2) and to receive, in response to said inquiry signal, said signal representing said individual code emitted by said means for emitting a signal representing said individual code (12).

4. A system as claimed in claim 3, wherein said means for emitting a signal representing said individual code (12) only emit said signal representing said individual code in response to an inquiry signal generated by the means for enabling (16) of said detecting device (4).

5. A system as claimed in claim 3, wherein said means for enabling (16) are radio-frequency signals.

6. A system as claimed in claim 3, wherein said means for enabling (16) are infrared signals.

7. A system as claimed in claim 3, wherein said tag (2) also comprises means for signal processing (21) associated with said means for recording (11), to process the inquiry signal emitted by said detecting device (4) and to compare it with a series of parameters recorded in said means for recording (11); said means for signal processing (21) only activating said means for emitting a signal representing said individual code (12) when said inquiry signal meets predetermined criteria governing compatibility with said parameters recorded in said means for recording (11).

8. A system as claimed in claim 3, wherein said tag (2) also comprises means for emitting an indication signal in response to the inquiry signal sent by said detecting device (4); said inquiry signal simultaneously activating said means for emitting a signal representing said individual code (12) and said means for emitting an indication signal.

9. A system as claimed in claim 3, wherein said detecting device (4) also comprises means for displaying said individual code (19).

10. A system as claimed in claim 3, wherein said detecting device (4) is integrated in a cell phone (5).

11. A system as claimed in claim 3, wherein said personal item is an item of clothing.

12. A system as claimed in claim 3, wherein said personal item is a cell phone (5) comprising both said detecting device (4) and said tag (2).

13. A system as claimed in claim 4, wherein said means for enabling (16) generate said inquiry signal in a predetermined direction.

14. A system as claimed in claim 4, wherein said means for enabling (16) are radio-frequency signals.

15. A system as claimed in claim 4, wherein said means for enabling (16) are infrared signals.

16. A system as claimed in claim 4, wherein said tag (2) also comprises means for signal processing (21) associated with said means for recording (11), to process the inquiry signal emitted by said detecting device (4) and to compare it with a series of parameters recorded in said means for recording (11); said means for signal processing (21) only activating said means for emitting a signal representing said individual code (12) when said inquiry signal meets predetermined criteria governing compatibility with said parameters recorded in said means for recording (11).

17. A system as claimed in claim 4, wherein said tag (2) also comprises means for emitting an indication signal in response to the inquiry signal sent by said detecting device (4); said inquiry signal simultaneously activating said means for emitting a signal representing said individual code (12) and said means for emitting an indication signal.

18. A system as claimed in claim 4, wherein said detecting device (4) also comprises means for displaying said individual code (19).

19. A system as claimed in claim 4, wherein said detecting device (4) is integrated in a cell phone (5).

20. A system as claimed in claim 10, wherein said cell phone (5) comprises a dedicated control button (17) for activating said means for enabling (16); and a display (19) for displaying said individual code.

21. A system as claimed in claim 4, wherein said personal item is an item of clothing.

22. A system as claimed in claim 4, wherein said personal item is a cell phone (5) comprising both said detecting device (4) and said tag (2).

23. A system as claimed in claim 13, wherein said means for emitting a signal representing said individual code (12) comprise a passive transponder activated by said means for enabling (16).

24. A system as claimed in claim 13, wherein said means for enabling (16) are radio-frequency signals.

25. A system as claimed in claim 13, wherein said means for enabling (16) are infrared signals.

26. A system as claimed in claim 13, wherein said tag (2) also comprises means for signal processing (21) associated with said means for recording (11), to process the inquiry signal emitted by said detecting device (4) and to compare it with a series of parameters recorded in said means for recording (11); said means for signal processing (21) only activating said means for emitting a signal representing said individual code (12) when said inquiry signal meets predetermined criteria governing compatibility with said parameters recorded in said means for recording (11).

27. A system as claimed in claim 13, wherein said tag (2) also comprises means for emitting an indication signal in response to the inquiry signal sent by said detecting device (4); said inquiry signal simultaneously activating said means for emitting a signal representing said individual code (12) and said means for emitting an indication signal.

28. A system as claimed in claim 13, wherein said detecting device (4) also comprises means for displaying said individual code (19).

29. A system as claimed in claim 13, wherein said detecting device (4) is integrated in a cell phone (5).

30. A system as claimed in claim 13, wherein said personal item is an item of clothing.

31. A system as claimed in claim 23, wherein said means for enabling (16) are radio-frequency signals.

32. A system as claimed in claim 23, wherein said means for enabling (16) are infrared signal.

33. A method for establishing deferred interpersonal relationships between individuals meeting by chance, comprising the steps of applying an identification tag (2) to a personal item (3), said tag (2) having means for recording (11) an individual code assigned to said tag (2), and means for emitting a signal representing said individual code (12);

assigning an individual code to said tag (2);

recording on said means for recording (11) said individual code assigned to said tag (2);

emitting a signal representing said individual code (12) from said tag (2) to a portable detecting device (4) having means for receiving (20) said signal representing said individual code that is emitted by said means for emitting a signal representing said individual code (12);

receiving said signal representing said individual code by said means for receiving (20); and providing a dedicated internet web site having an E-mail box associated to said individual code and assigned to an owner of said item, wherein said E-mail box is accessible directly, given said individual code, via said dedicated internet web site, while ensuring the anonymity of the owner of said item.

* * * * *